ID1001000B2

(12) United States Patent
Torrez (10) Patent No.: US 10,295,170 B2
(45) Date of Patent: May 21, 2019

(54) MULTI-MIRROR SYSTEMS AND METHOD

(71) Applicant: Joelle Torrez, Friendswood, TX (US)

(72) Inventor: Joelle Torrez, Friendswood, TX (US)

( * ) Notice: Subject to any disclaimer, the term of this patent is extended or adjusted under 35 U.S.C. 154(b) by 65 days.

(21) Appl. No.: 15/465,596

(22) Filed: Mar. 21, 2017

(65) Prior Publication Data

US 2018/0274777 A1    Sep. 27, 2018

(51) Int. Cl.
*A45D 42/10* (2006.01)
*F21V 33/00* (2006.01)
*G02B 7/182* (2006.01)
*A45D 42/08* (2006.01)
*F21Y 115/10* (2016.01)

(52) U.S. Cl.
CPC ............ *F21V 33/004* (2013.01); *A45D 42/08* (2013.01); *A45D 42/10* (2013.01); *G02B 7/182* (2013.01); *F21Y 2115/10* (2016.08)

(58) Field of Classification Search
CPC .... F21V 33/004; F21V 33/0004; F21V 33/00; F21V 21/26; F21V 21/14; F21V 21/30; F21V 21/145; A45D 42/08; A45D 42/10; A45D 42/00; A45D 42/16; G02B 7/182; F21Y 2115/10
See application file for complete search history.

(56) References Cited

U.S. PATENT DOCUMENTS

| | | | | |
|---|---|---|---|---|
| 3,378,679 A * | 4/1968 | Trudeau | ................... | F21V 33/00 362/129 |
| 3,435,199 A * | 3/1969 | Ely | ......................... | F21V 33/00 362/141 |
| 3,794,828 A * | 2/1974 | Arpino | ................... | A45C 5/005 307/38 |
| 4,850,688 A | 7/1989 | Rosenberg et al. | | |
| 5,442,488 A | 8/1995 | Pastorino | | |
| 6,241,357 B1 * | 6/2001 | Lee | ......................... | A45D 42/00 359/872 |
| 6,273,585 B1 * | 8/2001 | Wu | ......................... | F21V 21/30 362/135 |
| 6,305,809 B1 * | 10/2001 | Zadro | ..................... | A45D 42/08 248/474 |
| 6,347,876 B1 * | 2/2002 | Burton | ................... | A45D 42/10 362/141 |
| 6,382,802 B1 * | 5/2002 | Goodman | .............. | A45D 42/16 248/469 |
| 6,604,836 B2 | 8/2003 | Carlucci et al. | | |
| 7,048,406 B1 * | 5/2006 | Shih | ........................ | A45D 42/10 362/135 |
| 7,347,573 B1 * | 3/2008 | Isler | ....................... | A45D 42/10 359/854 |
| 7,513,476 B1 * | 4/2009 | Huang | ................... | A45D 42/16 248/474 |
| 7,813,060 B1 | 10/2010 | Bright et al. | | |
| 8,162,502 B1 | 4/2012 | Zadro | | |
| 8,356,908 B1 * | 1/2013 | Zadro | .................... | A45D 42/10 362/135 |
| 9,347,660 B1 | 5/2016 | Zadro | | |
| 2008/0123266 A1 * | 5/2008 | Hung | ..................... | A45D 42/00 361/679.06 |
| 2014/0362562 A1 * | 12/2014 | Fung | ...................... | A45D 42/10 362/144 |

* cited by examiner

*Primary Examiner* — Bao Q Truong
(74) *Attorney, Agent, or Firm* — Integrity Patent Group, PLC; Charles E. Runyan (57) ABSTRACT

A multi-mirror system that includes an electrically-powered, lighted mirror having a plurality of reflective surfaces and a means with which to control the intensity of the emitted light.

20 Claims, 5 Drawing Sheets

MULTI-MIRROR SYSTEMS AND METHOD

BACKGROUND OF THE INVENTION

The following includes information that may be useful in understanding the present disclosure. It is not an admission that any of the information provided herein is prior art, or material, to the presently described or claimed inventions, or that any publication or document that is specifically or implicitly referenced is prior art.

1. Field of the Invention

The present disclosure relates generally to the field of personal grooming devices, and more specifically relates to vanity mirrors.

2. Description of Related Art

A makeup table or vanity is a dressing table equipped with mirrors and used to applying makeup or fashion accessories. Vanity mirrors may be wall-mounted, desk mounted, portable, and lighted. An additional magnifying mirror is used for viewing close up areas (e.g., for application of eye makeup). The related art pertains to different types of mirrors that are movable relative to their support, mirrors having the capability to rotate about the perpendicular axes, and mirrors with rotary to linear motion to convert mirror adjustment for rotation about the perpendicular axes.

Several attempts have been made to improve vanity mirrors, such as those found in U.S. Pat. No. 9,347,660 to Zadro; U.S. Pat. No. 7,813,060 to Bright et al.; U.S. Pat. No. 5,442,488 to Pastorino; U.S. Pat. No. 8,162,502 to Zadro; U.S. Pat. No. 4,850,688 to Rosenberg et al.; and U.S. Pat. No. 6,604,836 to Carlucci et al. This art is representative of illuminated mirror systems. However, none of the above references, taken either singly or in combination, is seen to describe the disclosure as claimed.

BRIEF SUMMARY OF THE INVENTION

In view of the foregoing state of the known vanity mirror art, the present disclosure provides a novel multi-mirror system. The general purpose of the present disclosure, which will be described subsequently in greater detail is to provide an electrically-powered, lighted mirror having a plurality of reflective surfaces.

The multi-mirror system is disclosed herein includes a device for applying cosmetics, which may include a plurality of mirrors, means for rotating the mirrors, an extension member, and a base. The plurality of mirrors may be circumferentially distributed about a horizontal axis and are oriented to radiate outward from the horizontal axis. The means for rotating the mirror support about the horizontal axis may include a rotational couple between the cylindrical-type structure and the extension member.

The device extension member may be configured to support both the mirror support and the means for rotating the mirror support about the horizontal axis. The extension member may include opposing arms, each extending toward a cylinder end cap and each fixed to a bracket. The extension member is further configured to elevate the mirror support of the horizontal axis to a height above a resting surface. The base is configured to support the extension member on a resting surface without supplemental support. The base may further include an extension member receiver that may be configured to receive the extension member.

The plurality of mirrors may include three mirrors (a 3-in-1 mirror) that are circumferentially distributed about the horizontal axis. The plurality of mirrors may include at least one non-magnified mirror, a magnifying mirror having at least a magnification factor of seven, and a non-reversing mirror. The non-reversing mirror may be structured and arranged from two mirrors joined at a vertical angle such that the reflected image appears to the user as a non-reversed image. Further, a mirror support may be included, which may be configured to support each of the plurality of mirrors, while providing for 360 degrees of circumferential motion about the horizontal axis of the mirror support.

The device further may further include a light source, with the light source configured to light at least one of the plurality of mirrors. The light source may include at least one lighting tube configured to emit light onto the user and/or at least one light emitting diode. The light source may further include at least one diffusing medium configured to provide an even distribution and softening of light source. The light source may be parallel and/or adjacent to at least one upper edge of the plurality of mirrors. The light source may be parallel and/or adjacent to at least one lower edge of the plurality of mirrors. The light source may further include a power supply configured to power the light source. The power supply may include at least one of a universal serial bus (USB), a rechargeable DC energy storage, and an AC power supply. The light source may be configured to output varying intensity in response to a user command.

The multi-mirror further may be a kit including at least one 3-in-1 mirror device and a set of user instructions. A method of using a 3-in-1 mirror device may include the steps of: placing the base on a resting surface, powering on the light source, adjusting the light source intensity, and rotating the mirror support to select one of the plurality of mirrors for use. The method of use may further include the step of powering off the light source when use is no longer desired.

For purposes of summarizing the disclosure, certain aspects, advantages, and novel features of the disclosure have been described herein. It is to be understood that not necessarily all such advantages may be achieved in accordance with any one particular embodiment of the disclosure. Thus, the disclosure may be embodied or carried out in a manner that achieves or optimizes one advantage or group of advantages as taught herein without necessarily achieving other advantages as may be taught or suggested herein. The features of the disclosure which are believed to be novel are particularly pointed out and distinctly claimed in the concluding portion of the specification. These and other features, aspects, and advantages of the present disclosure will become better understood with reference to the following drawings and detailed description.

BRIEF DESCRIPTION OF THE DRAWINGS

The figures which accompany the written portion of this disclosure represent various embodiments and methods of use for the present disclosure, a multi-mirror system, constructed and operative according to the teachings of the present disclosure.

The various embodiments of the present disclosure will hereinafter be described in conjunction with the appended drawings, wherein like designations denote like elements.

DETAILED DESCRIPTION

As discussed above, embodiments of the present disclosure relate to an illuminated mirror system and more particularly to a multi-mirror system, that is an electrically-powered, lighted mirror having a plurality of reflective surfaces. The present disclosure holds significant improvements, and serves as a 3-in-1 mirror system. The following disclosure is for a dual magnification illuminated multi-spectrum table mirror. Preferably, an illuminated mirror system should provide an electrically-powered, lighted mirror having a plurality of reflective surfaces and, yet would operate reliably and be manufactured at a modest expense.

Generally speaking, the multi-mirror system is described herein as a device for applying cosmetics or a 3-in-1 mirror, which can be configured for use in both professional and consumer settings. It may be powered by AC current and DC current with a rechargeable battery inside the base portion for home, office, and traveling use.

In the illustrated configuration, the mirror may include three different mirrors in one round cylinder that rotates so each mirror is easily used. It may include an upper and lower LED light tube above and below each mirror for proper lighting. One mirror may be a 1× magnifying mirror for normal makeup applications that make it easier to see your face and apply makeup more accurately. It may also include a 7× magnifying mirror that helps the user to apply the makeup in specific areas that would be difficult to see, and may otherwise need a makeup person to apply it for the user. Additionally, this mirror may include a non-reversing true mirror. For example, by adding two other mirrors at a 90 degree angle to each other, the main mirror can project the user's image as other people see the user, instead of reversing the image as ordinary mirrors do.

Advantageously, by including a mirror that allows the user to see themselves as others actually see them, the user may apply the makeup even more accurately, because of the true image seen. The device may be adapted for a professional setting, and more importantly can be adapted for consumer or home use. It can be made of metal or plastic.

Figure 1:
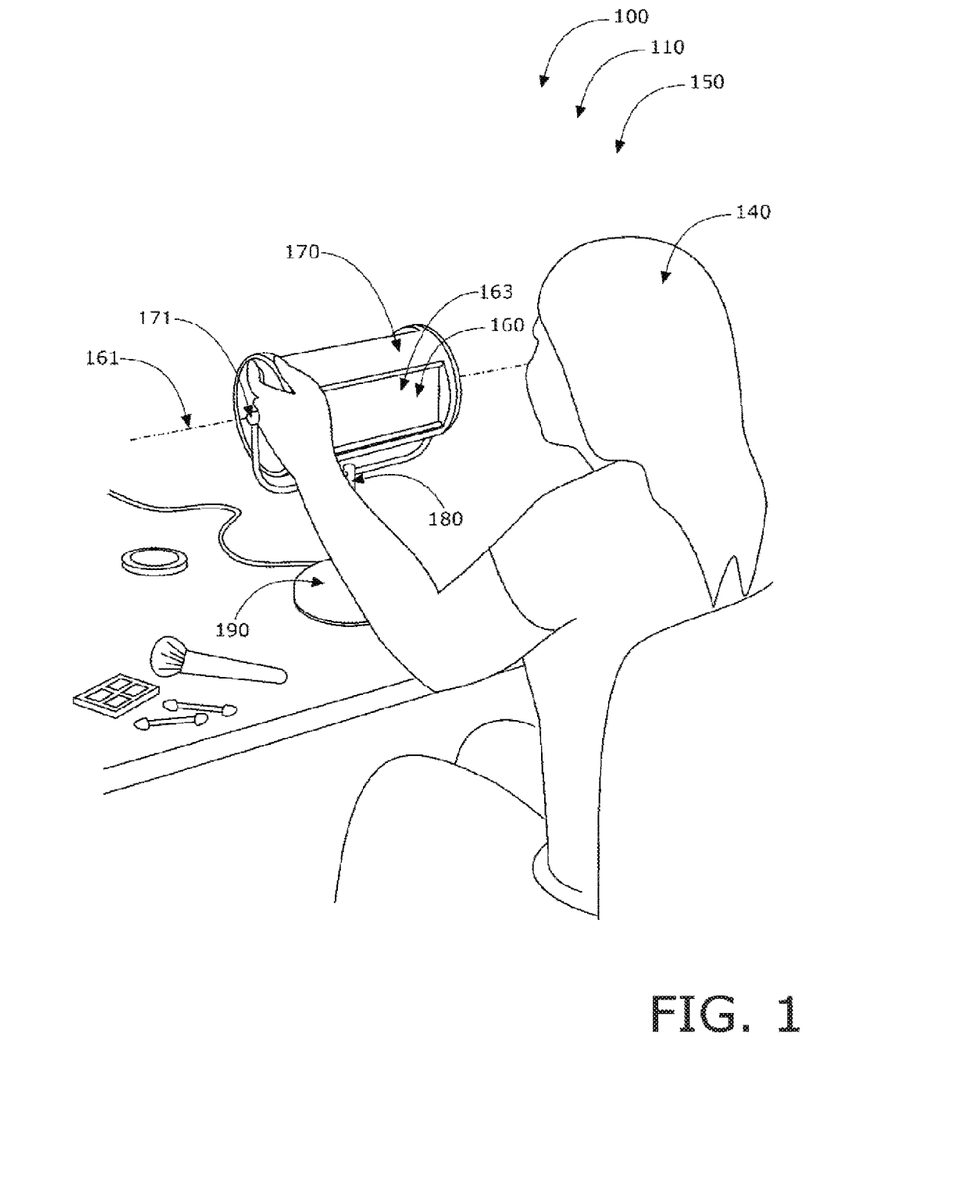
FIG. 1 shows a perspective view, illustrating a multi-mirror system during an 'in-use' condition, according to an embodiment of the present disclosure.

Referring to the drawings by numerals of reference, there is shown in FIG. 1, a multi-mirror system 100, such as the device for applying cosmetics 110 (or 3-in-1 mirror), during an "in-use condition" 150, whereby a user 140 may use the device for applying cosmetics 110. The device for applying cosmetics 110 may include a plurality of mirrors 160, a mirror support 170, a means for rotating the mirror support about a horizontal axis 171, an extension member 180, and a base 190.

The plurality of mirrors 160 may be circumferentially distributed about the horizontal axis 161, and oriented to radiate outward from the horizontal axis 161 (e.g., facing the user 140 when radially aligned). The mirror support 170 may be configured to support each of the plurality of mirrors 160 circumferentially about the horizontal axis 161 of the mirror support 170. The means for rotating the mirror support about the horizontal axis 171 may be structured and arranged to provide 360 degrees of circumferential motion about the horizontal axis 161, respectively, and further configured to secure the each of the plurality of mirrors 160 in a desired position about the horizontal axis 161, respectively. The extension member 180 may be configured to support both the mirror support 170 and the means for rotating the mirror support about the horizontal axis 171. The base 190 is configured to support the extension member 180 on a resting surface without supplemental support.

Figure 2:
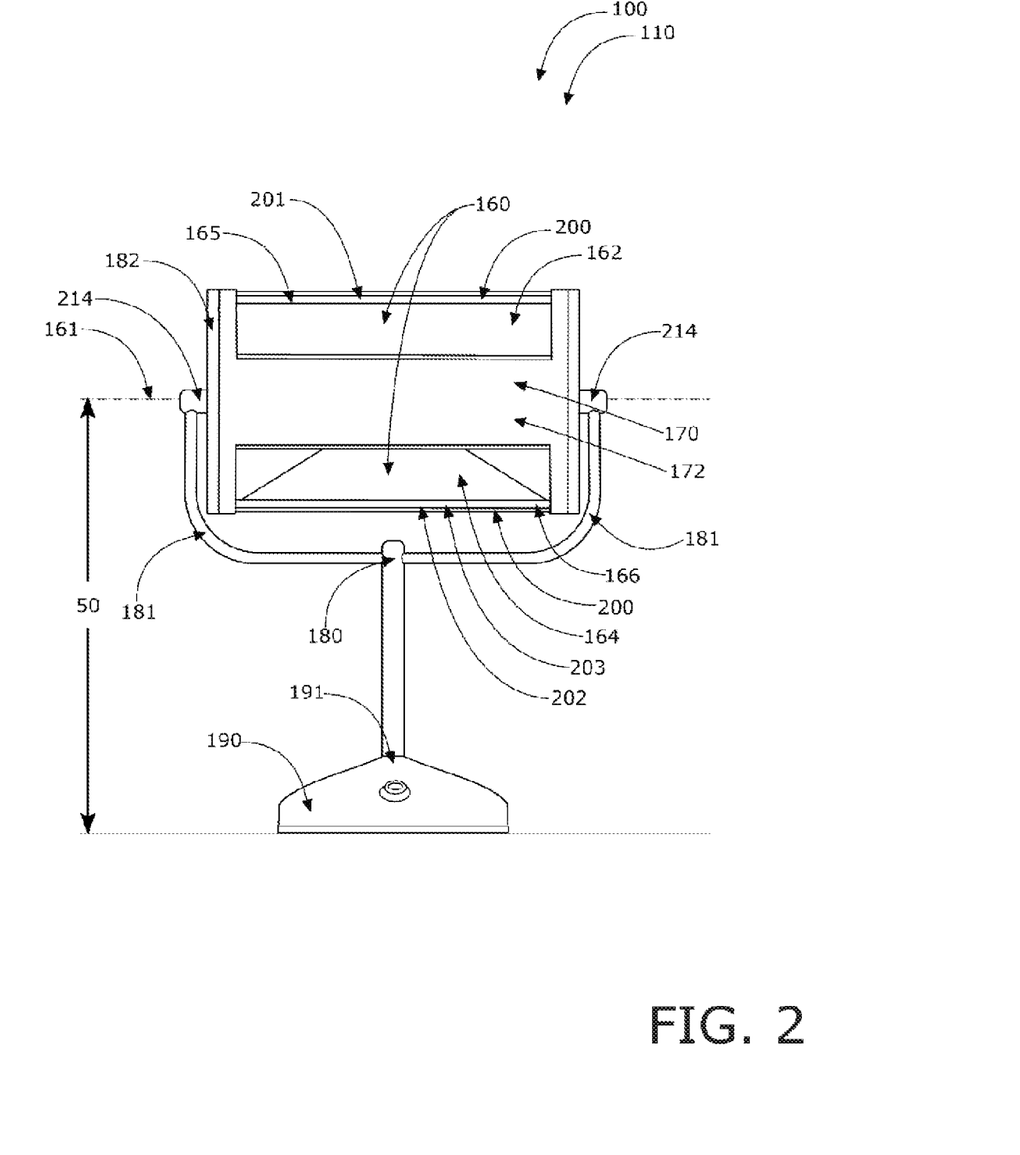
FIG. 2 is a front view, illustrating the multi-mirror system of FIG. 1, according to an embodiment of the present disclosure.

FIG. 2 shows a front view of the device for applying cosmetics 110 of FIG. 1. According to one embodiment, the plurality of mirrors 160 may include three mirrors that are circumferentially distributed about the horizontal axis 161. For example, the plurality of mirrors 160 may include at least one non-magnified mirror 162, a magnifying mirror having at least a magnification factor of seven 163 (FIG. 1), and a non-reversing mirror 164. According to one embodiment, the mirror support 170 further may include a rotating cylinder exterior housing 172.

According to one embodiment, the device for applying cosmetics 110 may further include a light source 200, with the light source 200 configured to light at least one of the plurality of mirrors 160. The light source 200 may include at least one lighting tube 201 configured to emit light onto the user 140 (FIG. 1). Similarly, the light source 200 may include at least one light emitting diode 202. In addition, the light source 200 may include at least one diffusing medium 203 configured together to provide an even distribution and/or softening of light source 200.

When included with the device 110, the light source 200 may be parallel and adjacent to at least one upper edge 165 of the plurality of mirrors 160. An additional light source 200 may be parallel and adjacent to at least one lower edge 166 of the plurality of mirrors 160 to create an even spectrum of light coverage over the at least one of the plurality of mirrors 160. According to one embodiment, the light source 200 may include individual lighting located adjacent to two or more opposing sides of each of the plurality of mirrors 160.

According to one embodiment, the extension member 180 may include opposing arms 181, each extending toward a cylinder end cap 182 (FIG. 4) and each fixed to an axle bracket 214 (FIG. 4). further configured to elevate the mirror support 170 of the horizontal axis 161 to a height 50 above a resting surface. Examples of height 50 include 24 inches, 12 inches, 10-30 inches, etc. The base 190 may further include an extension member receiver 191 that may be configured to receive the extension member 180.

Figure 3:
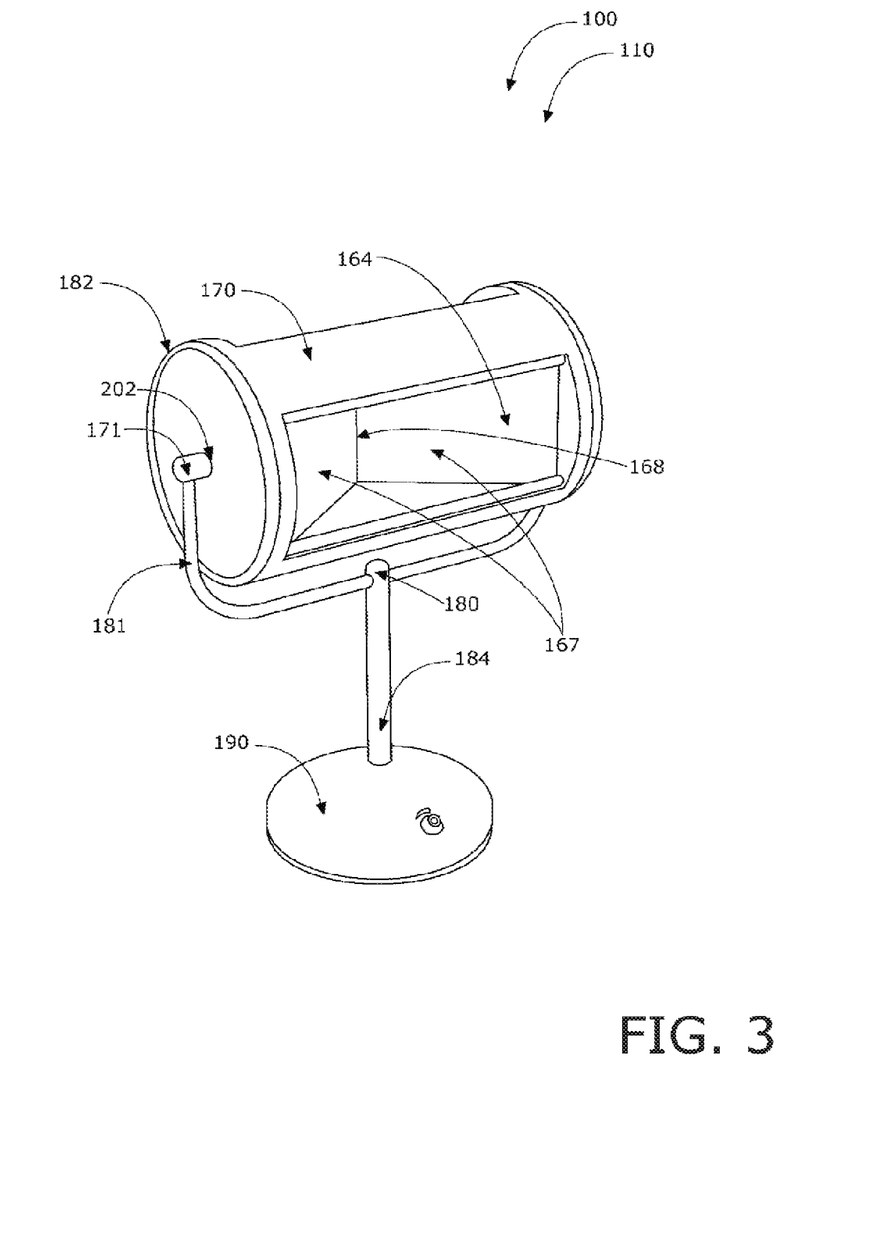
FIG. 3 is a perspective view, illustrating the multi-mirror system of FIGS. 1-2, according to an embodiment of the present disclosure.

FIG. 3 is a perspective view of the device for applying cosmetics 110 of FIG. 1. Here, the non-reversing mirror 164 is conveniently rotated to a "forward" (user facing) orientation. The non-reversing mirror 164 may be structured and arranged from two mirrors 167 joined at a 90 degree angle along a shared vertical edge 168, such that the reflected image appears to the user 140 (FIG. 1) as a non-reversed image.

According to one embodiment, the extension member 180 may include opposing arms 181. In particular, the extension member 180 may extend vertically (e.g., via post 184) from the base 190 toward the mirror support 170, and at a point below the mirror support 170 the extension member 180 may extend in opposing directions (e.g., via opposing arms 181) and towards opposing ends of the mirror support 170. The opposing arms 181 may then couple or be otherwise integrated with the means for rotating the mirror support about the horizontal axis 171. Here, the means for rotating the mirror support about the horizontal axis 171 is also shown including a rotational couple between the opposing arms 181 and the mirror support 170.

Figure 4:
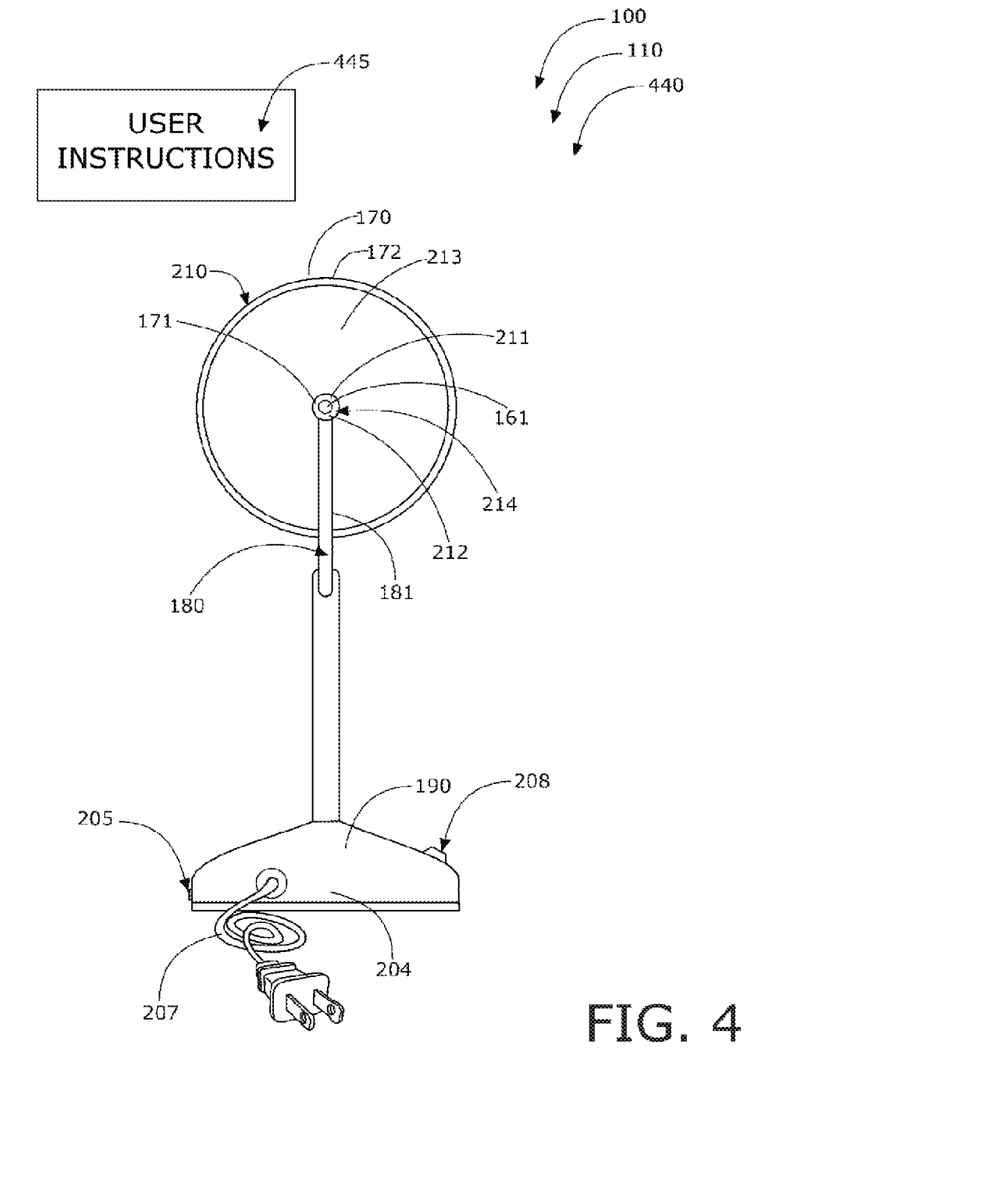
FIG. 4 is a side view, illustrating the multi-mirror system of FIGS. 1-3, according to an embodiment of the present disclosure.

FIG. 4, is a side view of the device for applying cosmetics 110. As above, the device for applying cosmetics 110 includes the mirror support 170, the means for rotating the mirror support about the horizontal axis 171, and the extension member 180, in structural and functional combination. As shown here, the mirror support 170 may include a cylindrical-type structure 210, having a center axis 211. The center axis 211 may be concentric with the horizontal axis 161 (FIG. 3).

Also as above, the means for rotating the mirror support about the horizontal axis 171 is also shown including a rotational couple 212 the mirror support 170 and the extension member 180. In particular, the rotational couple 212 may be between the cylindrical-type structure 210 and the opposing arms 181 and. For example, the rotational couple 212 may include a pair of cylinder end caps 213, each fixed to opposing ends of the cylindrical-type structure 210 (here, the rotating cylinder exterior housing 172). The rotational couple 212 may further include a pair of axle brackets 214 each fixed to one of the opposing arms 181, and each rotationally coupled to one of the pair of cylinder end caps 213, respectively.

The light source 200 may further include a power supply 204 configured to power the light source 200. The power supply 204 may include a universal serial bus (USB) interface 205, a rechargeable DC energy storage, and/or an AC power supply 207.

The light source 200 (FIG. 2) for the device for applying cosmetics 110 may include a power supply 204 configured to power the light source 200. The power supply 204 may include a universal serial bus (USB) 205, a rechargeable DC energy storage (embedded in base 190), and/or an AC power supply 207. Advantageously, this may provide flexibility for use. In addition, the light source 200 may include a user interface 208 configured to vary light intensity output by the light source 200, in response to a user command.

It should be noted that the multi-mirror system 100 may include a set of user instructions 445 and be arranged as kit 440. The kit 440 has instructions 445 such that functional relationships are detailed in relation to the structure of the multi-mirror system 100 (such that the multi-mirror system 100 can be used, maintained, or the like in a preferred manner). The multi-mirror system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as more or less mirror surfaces with varying levels of magnification, including more or less components, customized parts, a variety of color combinations for the base and extension member, metallic or plastic materials used in combination for the structure, etc., may be sufficient.

Figure 5:
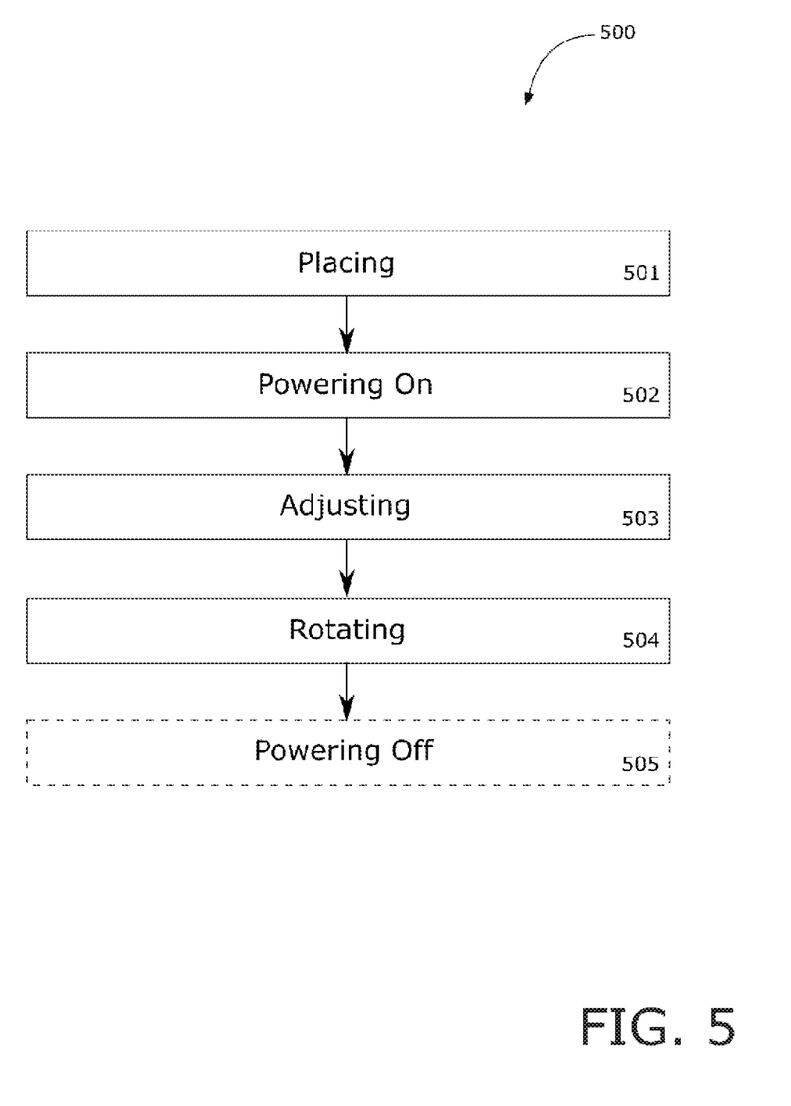
FIG. 5 is a flow diagram illustrating a method of use for the multi-mirror system of FIGS. 1-4, according to an embodiment of the present disclosure.

Referring now to FIG. 5 showing flow diagram 550 illustrating method of use 500 for the multi-mirror system 100, according to an embodiment of the present disclosure of FIGS. 1-4. As shown, method of use 500 may include the steps of: step one 501, placing the base 190 on a resting surface; step two 502, powering on the light source 200; step three 503, adjusting the light source 200 intensity; step four 504, rotating the mirror support 170 to select one of the plurality of mirrors 160 for use, and step five 505, powering off the light source 200 when use is no longer desired.

It should be noted that step 505 is an optional step and may not be implemented in all cases. Optional steps of method of use 500 are illustrated using dotted lines in FIG. 5 so as to distinguish them from the other steps of method of use 500. It should be further noted that the steps described in the method of use can be carried out in many different orders according to user preference. The use of "step of" should not be interpreted as "step for", in the claims herein and is not intended to invoke the provisions of 35 U.S.C. § 112(f).

The embodiments of the disclosure described herein are exemplary and numerous modifications, variations and rearrangements can be readily envisioned to achieve substantially equivalent results, all of which are intended to be embraced within the spirit and scope of the disclosure. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A device for applying cosmetics, the device comprising:
   a plurality of mirrors, each configured as an independent makeup mirror;
   a mirror support configured to support each of the plurality of mirrors, to position each of the plurality of mirrors circumferentially about a horizontal axis, and to orient each of the plurality of mirrors radially outward from said horizontal axis;
   an extension member with opposing arms configured to support the mirror support, the extension member further configured to elevate the horizontal axis to a height above a resting surface;
   and
   a base configured to support the extension member on a resting surface without supplemental support,
   wherein the arms rotationally connect to the mirror support.

2. The device of claim 1, wherein the plurality of mirrors includes three mirrors circumferentially distributed about the horizontal axis;
   wherein the mirror support includes a cylindrical-type structure having a center axis, the center axis concentric with the horizontal axis;
   and
   wherein the arms rotationally connect to the mirror support through a rotational couple between the cylindrical-type structure and the extension member.

3. The device of claim 2, wherein the mirror support further includes a rotating cylinder exterior housing; wherein the rotational couple includes a pair of cylinder end caps, each cylinder end cap fixed to opposing ends of the rotating cylinder exterior housing;
   wherein the rotational couple further includes a pair of axle brackets, each axle bracket rotationally coupled to one of the pair of cylinder end caps, respectively;
   wherein the extension member includes opposing arms, each opposing arm extending toward each cylinder end cap, respectively, and each opposing arm fixed to one axle bracket, respectively;
   and
   wherein the base includes an extension member receiver that is configured to receive the extension member.

4. The device of claim 1, further comprising:
   a light source;

and
a power supply configured to power the light source.

5. The device of claim 4, wherein the power supply includes a universal serial bus (USB).

6. The device of claim 4, wherein the power supply includes a rechargeable DC energy storage.

7. The device of claim 6, wherein the power supply includes an AC power supply.

8. The device of claim 4, wherein the light source includes a user interface that is configured to vary light intensity output by the light source in response to a user command.

9. The device of claim 4, wherein the light source includes at least one lighting tube configured to emit light onto a user.

10. The device of claim 4, wherein the light source includes at least one light emitting diode and at least one diffusing medium configured together to provide an even distribution and softening of light source.

11. The device of claim 4, wherein the light source is parallel and adjacent to at least one upper edge of the plurality of mirrors.

12. The device of claim 4, wherein the light source is parallel and adjacent to at least one lower edge of the plurality of mirrors.

13. The device of claim 1, wherein the arms are structured and arranged to secure each of the plurality of mirrors in a desired position about 360 degrees of circumferential motion about the horizontal axis.

14. The device of claim 1, wherein the plurality of mirrors includes at least one of a non-magnified mirror, a magnifying mirror having at least a magnification factor of seven, and a non-reversing mirror.

15. The device of claim 1, further comprising a light source configured to light at least one of the plurality of mirrors.

16. The device of claim 1, wherein the plurality of mirrors includes a non-reversing mirror; and
wherein said non-reversing mirror is structured and arranged from two mirrors joined at a 90 degree angle along a shared vertical edge, such that a reflected image appears to the user as a non-reversed image.

17. A 3-in-1 mirror system comprising:
a plurality of mirrors, each configured as an independent makeup mirror;
a mirror support configured to support each of the plurality of mirrors, to position each of the plurality of mirrors circumferentially about a horizontal axis, and to orient each of the plurality of mirrors radially outward from said horizontal axis;
an extension member with opposing arms configured to support the mirror support, the extension member further configured to elevate the horizontal axis to a height above a resting surface;
a base configured to support the extension member on the resting surface without supplemental support;
a light source; and
a power supply configured to power the light source;
wherein said plurality of mirrors include three mirrors circumferentially distributed about said horizontal axis;
wherein said mirror support includes a cylindrical-type structure having a center axis, said center axis concentric with said horizontal axis;
wherein the arms rotationally connect to the mirror support through a rotational couple between said cylindrical-type structure and said extension member;
wherein said mirror support further includes a rotating cylinder exterior housing;
wherein said rotational couple includes a pair of cylinder end caps, each cylinder end cap fixed to opposing ends of said rotating cylinder exterior housing;
wherein the rotational couple further includes a pair of axle brackets, each axle bracket rotationally coupled to one of said pair of cylinder end caps, respectively;
wherein said extension member includes opposing arms, each opposing arm extending toward each said cylinder end cap, respectively, and each fixed to one said axle bracket, respectively;
wherein said base includes an extension member receiver that is configured to receive said extension member;
wherein said power supply includes a universal serial bus (USB);
wherein said power supply includes a rechargeable DC energy storage;
wherein said power supply includes an AC power supply;
wherein said light source includes a user interface that is configured to vary light intensity output by the light source, in response to a user command;
wherein said light source includes at least one lighting tube configured to emit light onto said user;
wherein said light source includes at least one light emitting diode and at least one diffusing medium configured together to provide an even distribution and softening of light source;
wherein said light source is parallel and adjacent to at least one upper edge of said plurality of mirrors;
wherein said light source is parallel and adjacent to at least one lower edge of said plurality of mirrors;
wherein the arms are structured and arranged to secure said each of said plurality of mirrors in a desired position about 360 degrees of circumferential motion about said horizontal axis;
wherein said plurality of mirrors includes at least one of a non-magnified mirror, a magnifying mirror having at least a magnification factor of seven, and a non-reversing mirror;
wherein the light source is configured to light at least one of said plurality of mirrors ;
wherein said plurality of mirrors includes said non-reversing mirror;
wherein said non-reversing mirror is structured and arranged from two mirrors joined at a 90 degree angle along a shared vertical edge, such that a reflected image appears to the user as a non-reversed image.

18. The 3-in-1 mirror system of claim 17, further comprising a set of user instructions;
and
wherein the 3-in-1 mirror system is arranged as a kit.

19. A method comprising:
providing the mirror system of claim 1;
placing the base of the 3-in-1 mirror system on a resting surface;
powering on a light source of the 3-in-1 mirror system;
adjusting a light source intensity of the light source; and
rotating a mirror support of the 3-in-1 mirror system to select one of three mirrors for use.

20. A method comprising:
providing the mirror system of claim 17;
placing the base of the 3-in-1 mirror system on a resting surface;
powering on a light source of the 3-in-1 mirror system;
adjusting a light source intensity of the light source; and
rotating a mirror support of the 3-in-1 mirror system to select one of three mirrors for use powering off said light source when use is no longer desired.

\* \* \* \* \*